R. A. WEINHARDT.
CRANK SHAFT.
APPLICATION FILED JUNE 8, 1918.

1,303,000.

Patented May 6, 1919.

INVENTOR
R. A. Weinhardt
BY
ATTORNEYS.

UNITED STATES PATENT OFFICE.

ROBERT A. WEINHARDT, OF DETROIT, MICHIGAN, ASSIGNOR TO CONTINENTAL MOTORS CORPORATION, OF DETROIT, MICHIGAN, A CORPORATION OF VIRGINIA.

CRANK-SHAFT.

1,303,000.

Specification of Letters Patent.

Patented May 6, 1919.

Original application filed September 20, 1916, Serial No. 121,098. Divided and this application filed June 8, 1918. Serial No. 239,040½.

*To all whom it may concern:*

Be it known that I, ROBERT A. WEINHARDT, a citizen of the United States of America, residing at Detroit, in the county of Wayne and State of Michigan, have invented certain new and useful Improvements in Crank-Shafts, of which the following is a specification, reference being had to the accompanying drawings.

This is a division of my other application for crank shafts, filed September 20, 1916, Serial No. 121,098.

This invention relates to balanced crank shafts for high speed explosive engines and more particularly to an arrangement of counterbalance for one of a six throw, four bearing type whereby three balance weights are so designed and disposed as to effectively neutralize the couple set up by the revolution of the crank arms or checks and associated crank pins and thereby minimize the strain that is otherwise put upon the bearing. One feature of the arrangement is the disposition of the weights or counterbalance so that each section is independently taken care of by a companion weight.

The invention consists in the matters hereinafter set forth, and more particularly pointed out in the appended claims.

Figure 1:
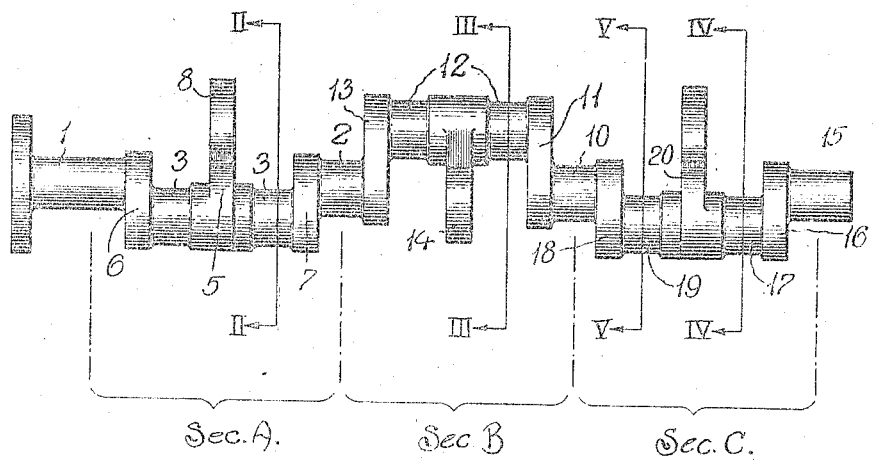
Figure 1 is a view in elevation of a crank shaft embodying features of the invention.
Figure 2:
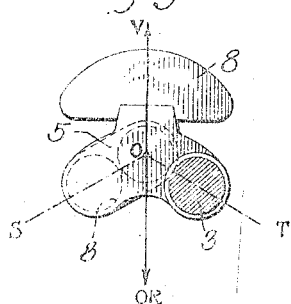
Fig. 2 is a section taken on or about line II—II of Fig. 1.
Figure 3:
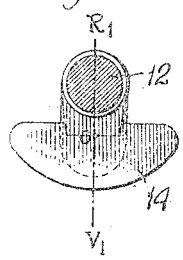
Fig. 3 is a view in section taken on or about line III—III of Fig. 1.

Referring to the drawings, a crank shaft may be considered as divided into sections by its bearings or journals. As herein shown the crank shaft has a section A lying between an end journal 1 and an intermediate journal 2, with oppositely disposed cranks 3 which are interconnected by a long check or crank arm 5 and are suitably secured to the journals by crank arms or cheeks 6 and 7 oppositely and symmetrically disposed to each other. Referring to Fig. 2, the resultant of the centrifugal force exerted by the arm 6 is clearly represented by the line OS and that of the reversely disposed cheek 7 by the line OT while the resultant of these couples or forces OS and OT and also of the elongated cheek 5, which is off-side and not symmetrical to the center O, is likewise in the line OR which may be coincident and substantially is coincident to the resultant of the lines OS and OT. Accordingly a weight or balance 8 is applied to the crest of the cheek 5 in such manner that its mass when revolving produces a centrifugal couple in the direction of the line OV which is directly opposed to and equal to the line OR. Consequently this portion of the shaft or the section A thereof, is in running or dynamic balance.

An intermediate bearing or journal 10 with the short cheek 11, double crank pin 12, short crank arm or cheek 13 and the journal 2 forms the middle section B of the shaft. Both the short cheeks 13 and 11 are in the same plane and consequently their motion together with that of the double crank pin 12 results in a moment or couple that may be represented by the lines ORI. A suitable counterbalance 14 symmetrically disposed between the arms 11 and 13 on the middle portion of the crank pin 12, is arranged to produce a couple OVI that is directly opposite to and the equal of the couple ORI so that the section B of the shaft is in proper running balance and there is no side thrust upon the bearings.

Figure 4:
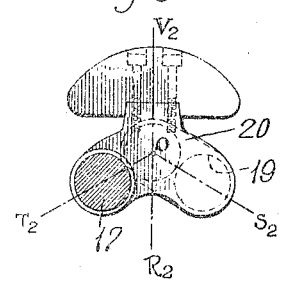
Fig. 4 is a view in section taken on or about line IV—IV of Fig. 1.

The section C at the other end of the shaft is similar to section A with reverse position of elements. There is an outlet crank shaft journal 15 connected by a short cheek 16 with a crank pin 17 and a reversely disposed short cheek 18 connecting the journal 10 with a crank pin 19, a long cheek 20 coupling the pins 17 and 19. As seen in Fig. 4, the resultant of one half of the crank pin and the cheek 12 when in motion may be represented by the lines $OS_2$. The resultant of the cheek 16 and the crank pin 17 is properly indicated by the line $OT_2$. The revolution of the large cheek 20 causes a centrifugal couple $OR_2$ which is substantially coincident also with the resultant of the couples $OS_2$ and $OT_2$. Consequently a weight placed upon the side of the member 20 opposite to the crank pins 17 and 19, if properly disposed, as herein indicated produces a couple $OV_2$ which counterbalances and eliminates the couple $OR_2$ or the resultant of the couples $OT_2$ and $OS_2$. This brings the section into complete balance.

Figure 6:
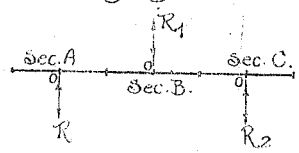
Fig. 6 is a diagram showing the disposition of the forces diagrammatically.
Figure 5:
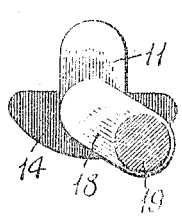
Fig. 5 is a view in section taken on or about line V—V of Fig. 1.

As indicated in the diagram in Fig. 6 the couple OR on one side of the shaft is balanced in section A so as to be nullified, as indicated by the opposed arrow heads. On the middle section B the resultant OR' is similarly counterbalanced and eliminated and in section C the same result is obtained in regard to the resultant $OR_2$.

As a result of this construction a crank shaft is obtained that is capable of running at high speed in perfect balance. Each section is taken care of between the bearings so that there is no tendency of any sections to turn on any axis but that to which the shaft is necessarily confined by the bearings. As a consequence the wear on the bearings is reduced to a minimum and the strain and breakage due to crystallization from weaving or rapid vibration is eliminated.

Obviously, changes in the details of construction may be made without departing from the spirit of my invention and I do not care to limit myself to any particular form or arrangement of parts.

What I claim is:

1. A crank shaft having four bearings and six throws, the section between the center bearings having correspondingly disposed crank arm cheeks and a counterbalance formed on the crank pin intermediate said cheeks adapted to balance the centrifugal couple set up thereby, the sections adjacent the end bearings each having a pair of oppositely disposed crank arm cheeks and an intermediate cheek, the ends of the latter being connected to the ends of the former by crank pins and a counterbalance formed on each intermediate crank arm cheek adapted to balance the centrifugal couples set up by the companion crank arms, cheek and pins.

2. A six throw, four bearing crank shaft having between each end bearing and the adjacent intermediate bearing, a pair of oppositely disposed short crank arm cheeks and a pair of crank pins projecting therefrom connected by a single long crank arm cheek, a pair of short crank arm cheeks intermediate the inner pair of journals connecting a single crank pin for two cranks, and a counterbalance for each end section disposed on the crest of the long arm cheek and arranged to produce a centrifugal couple that is equal to and the opposite of the resultant of the centrifugal couples set up by the revolving short and long arm cheeks and pins, and also a counterbalance for the central section adapted to set up a couple that is the opposite of and the equal to the resultant of the centrifugal couples set up by the revolution of the crank arm cheeks and connecting crank pin of said sections.

3. A six throw, four bearing crank shaft having between the end bearings and the adjacent intermediate bearings, pairs of oppositely disposed short crank arm cheeks and pairs of crank pins projecting therefrom connected by long arm cheeks, a pair of short crank arm cheeks connecting a single crank pin for two cranks intermediate the inner pair of journals, a counterbalance for each end section disposed on the crest of the long arm cheek and arranged to produce a centrifugal couple that is equal to and the opposite of the resultant of the centrifugal couples set up by the unbalanced masses of said section, and also a counterbalance for the central section adapted to set up a centrifugal couple equal and opposite to the resultant of the centrifugal couples set up by the unbalanced masses of said central section.

In testimony whereof I affix my signature in the presence of two witnesses.

ROBERT A. WEINHARDT.

Witnesses:
MARIE T. BARTHEL,
OTTO F. BARTHEL.